United States Patent
Carnwath

Patent Number: 5,918,409
Date of Patent: Jul. 6, 1999

[54] SELF CLEARING TUNNEL RAT TRAP

[76] Inventor: James R. Carnwath, 12024 86th Ave. NE., Kirkland, Wash. 98034

[21] Appl. No.: 09/097,569

[22] Filed: Jun. 15, 1998

[51] Int. Cl.⁶ .......................... A01M 19/00; A01M 23/12
[52] U.S. Cl. ..................................... 43/99; 43/61
[58] Field of Search ................... 43/58, 61, 98, 43/99

[56] References Cited

U.S. PATENT DOCUMENTS

| | | | |
|---|---|---|---|
| 1,012,351 | 12/1911 | Gold | 43/99 |
| 1,038,902 | 9/1912 | Kruczynski | 43/99 |
| 2,229,300 | 1/1941 | Montroy et al. | 43/98 |
| 2,247,931 | 7/1941 | Vincent et al. | 43/99 |
| 2,348,729 | 5/1944 | Crumrine | 43/99 |
| 2,360,651 | 10/1944 | Crumrine | 43/99 |
| 2,411,766 | 11/1946 | Vincent et al. | 43/99 |
| 2,437,507 | 3/1948 | Crumrine | 43/61 |
| 2,445,166 | 7/1948 | Crumrine | 43/99 |
| 2,448,780 | 9/1948 | Crumrine | 43/61 |
| 2,465,686 | 3/1949 | Hohler | 43/99 |
| 2,469,454 | 5/1949 | Crumrine | 43/99 |
| 2,515,947 | 7/1950 | Crumrine | 43/99 |
| 2,544,730 | 3/1951 | Schulz | 43/99 |
| 3,075,316 | 1/1963 | Pimental | 43/99 |
| 4,074,456 | 2/1978 | Tidwell | 43/98 |
| 4,255,891 | 3/1981 | Chen | 43/64 |
| 4,372,074 | 2/1983 | Arrabit | 43/69 |
| 4,612,724 | 9/1986 | Alboainin | 43/73 |
| 5,519,962 | 5/1996 | Cerullo | 43/72 |
| 5,815,982 | 10/1998 | Garretson | 43/121 |

*Primary Examiner*—Michael J. Carone
*Assistant Examiner*—Darren W. Ark
*Attorney, Agent, or Firm*—Robert W. Jenny

[57] ABSTRACT

The tunnel trap is electrically powered and kills by electrocution. The animal trips two triggers (infrared beams for example), one near each end of the trap, so that the animal is entirely inside the trap when the trap is set off, electrocuting the animal by electric contacts with its head and feet. An elevator then lifts the animal so that it can roll and/or slide out of the trap through an opening in a side of the trap. The triggering allows doors, one at each end opening of the trap, to drop and cover the openings. There are grids on the doors, electrically connected when the doors are down. The animal contacts one door grid or the other as it attempts to escape and electrical current passes from its head to its feet which are on an electrical grid on the floor of the trap. As the elevator rises it lifts the doors to reset them for the next cycle.

2 Claims, 3 Drawing Sheets

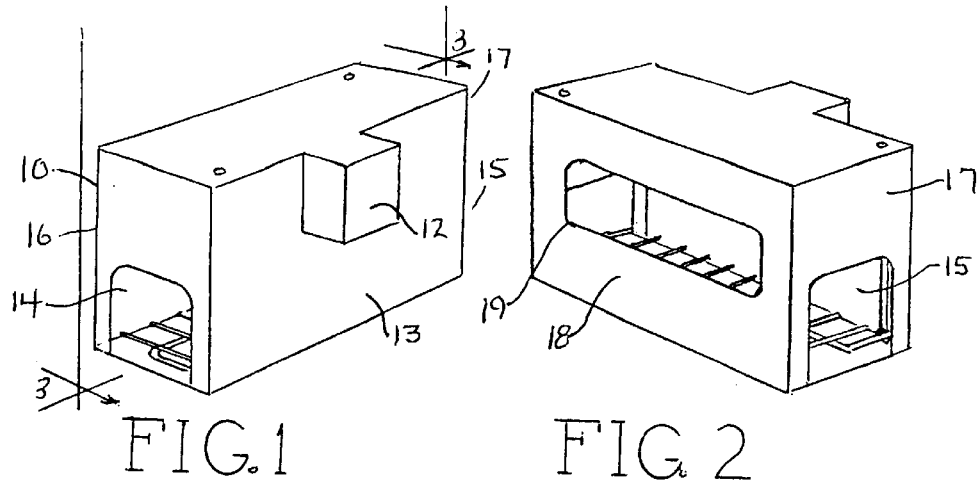
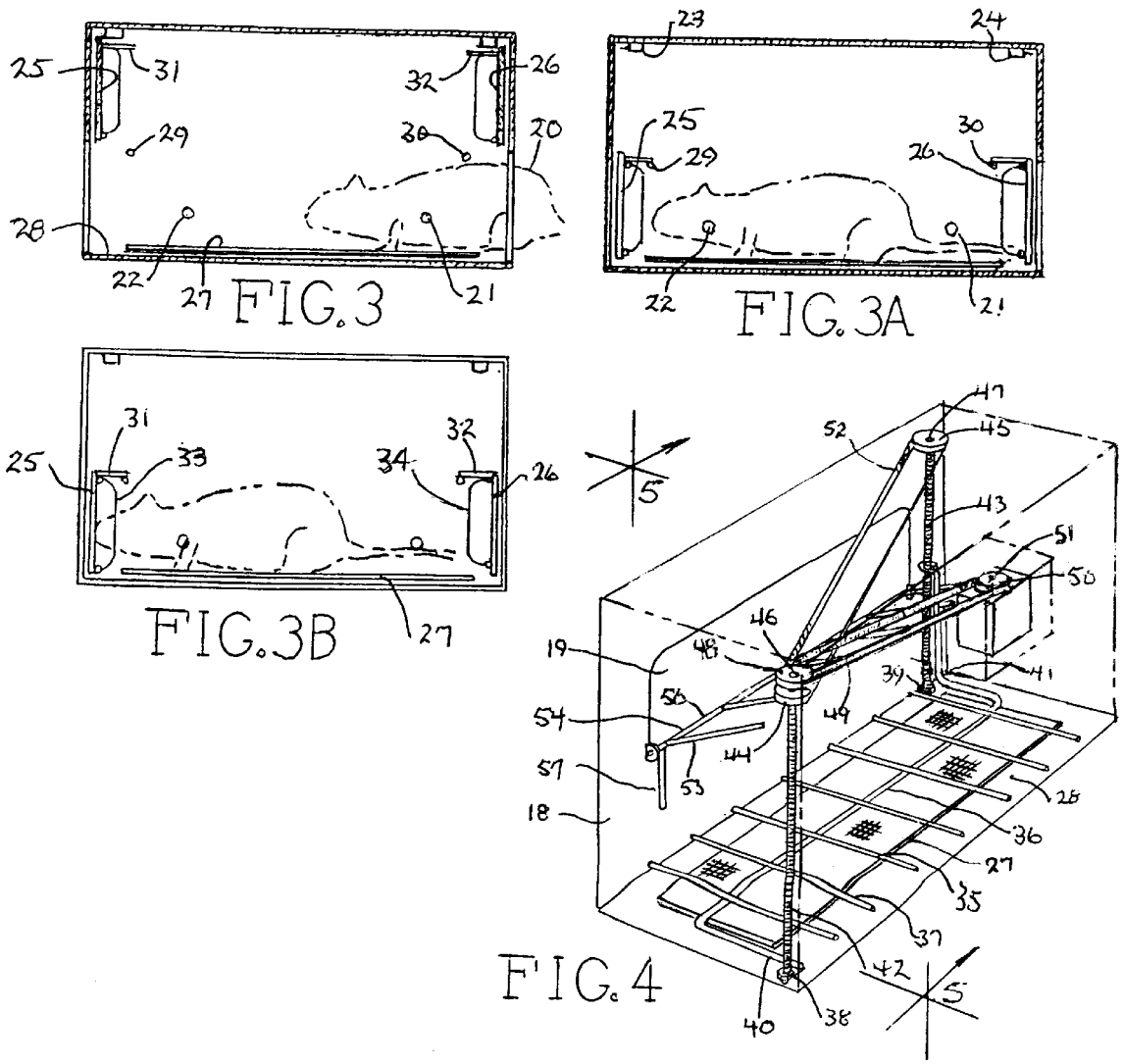

SELF CLEARING TUNNEL RAT TRAP

BACKGROUND OF THE INVENTION

1. Field

The subject invention is in the field of tunnel rat traps, in particular such traps which are self clearing and automatically reset.

2. Prior Art

The patents listed below are a sampling of related prior art and illustrate a common problem with prior art self clearing tunnel traps. The problem is that the floor of the trap is raised from the floor on which the trap rests. This makes it necessary for the rats to climb some sort of ramp and this is known to decrease the effectiveness of the trap.

Kruzynsk U.S. Pat. No. 1,038,902
Hohler U.S. Pat. No. 2,465,686
Arrabit U.S. Pat. No. 4,372,074

A second common problem is weight sensitivity, for release of the trap or the disposal of the executed animal or both. It is well known that the efficiency of weight sensitive traps tend to deteriorate under the effects of contamination and wear and tear.

A third common problem with traps in which the killing is done electrically is that the electrical contacts are on the feet, legs or body of the animal, rather than on the head. It is well known that electrocution in which the head is a primary contact is considerably more humane and effective than electrocution in which the head is not.

Accordingly, the primary objective of the subject invention is to provide a self clearing tunnel trap, the base of which rests directly on the surface supporting the trap, in which the head is the primary electrical contact on trapped rats and which is not weight sensitive.

SUMMARY OF THE INVENTION

The subject invention is a self clearing tunnel trap having the following operational sequence. An animal can enter either end of the tunnel with the intention of passing through. As it enters it interrupts one infrared beam, closing one switch. As the animal approaches the exit end it interrupts a second infrared beam, closing a second switch which is in series with the first switch and turns on the power to the electrocution circuit. The power first energizes solenoid operated latches to let sliding gates fall and close off both ends of the trap. The closed gates have electrical grids on their insides, electrically energized when the gates are closed. The floor of the trap is covered by a metallic grid and an open work elevator is installed over the grid. When the animal attempts to escape its nose contacts the grid on one of the doors and electricity passes through its head and body and feet to the grid on the floor. The deceased animal then rests on the elevator which rises to lift the animal up past a comb-like platform hinged on a sidewall of the trap. The tines of this platform lift as the animal and elevator rise past them and then fall into place so that the platform slopes toward an opening in the wall of the trap. As the elevator rises it lifts the gates and resets their latches for the next use. The elevator automatically descends after it reaches its upward limit of travel. As it descends it deposits the animal on the sloped comb-like structure and the animal slides off this structure and through the hole in the trap wall. When the elevator reaches its lowest position, power is shut off, the cycle is complete, and the trap is set for another operation.

The structure of the trap may be transparent, to minimize chances that animals detouring around the trap. In particular, the doors may be transparent (or frames only) to provide minimum inhibition of the animal's attempt to escape.

The invention is described below in more mechanical, electrical and structural detail, with reference to the attached drawings.

BRIEF DESCRIPTION OF THE DRAWINGS

FIG. 1 is a general view of a preferred configuration of the subject invention, viewed from the motor side.

FIG. 2 is a general view of the FIG. 1 configuration viewed from the exit side.

FIGS. 3, 3A and 3B are schematic sections, taken at 3—3 in FIG. 1, illustrating the sequence of an animal entering the trap and being electrocuted.

FIG. 4 is a semi-schematic illustration of the elevator and related mechanism used in the subject trap to clear the trap.

DETAILED DESCRIPTION OF THE INVENTION

Figure 5:
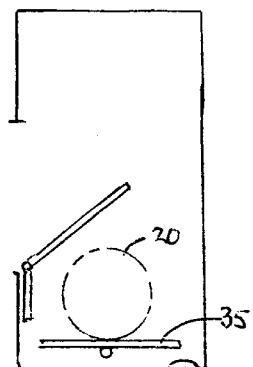
FIGS. 5, 5A, 5B and 5C are schematic sections taken at 5—5 in FIG. 4 showing the sequence of clearing the trap.

The subject invention is a self clearing tunnel rat trap. FIG. 1 illustrates one embodiment of the subject trap 10. Motor 11, not visible in this view is housed in protuberance 12 on side 13. There are openings 14 and 15 in ends 16 and 17 respectively, opening 15 not being visible in this view. FIG. 2 is a view of the trap of FIG. 1 from its exit side 18 showing opening 19 through which electrocuted animals exit the trap.

FIGS. 3, 3A and 3B are schematic sections taken at 3—3 in FIG. 1, illustrating the sequence of an animal entering the trap of FIG. 1 and being electrocuted. In FIG. 3 animal 20 has entered opening 14 in end 16 and tripped a first trigger, i.e. interrupted infrared beam 21, closing one of two serially connected electric switches in circuitry described below. In FIG. 3A the animal has advanced into the trap far enough to trip a second trigger, i.e. interrupt a second infrared beam 22, closing the second switch in the series and actuating latches 23 and 24 to allow doors 25 and 26 to drop into positions closing openings 14 and 15 respectively. Grid 27 on floor 28, and contacts 29 and 30 near doors 25 and 26 respectively are connected to the power circuit of the trap. When the doors drop, extensions 31 and 32 contact contacts 29 and 30 so that grids 33 and 34 on doors 25 and 26 respectively are connected into the circuit. In FIG. 3B the animal, in attempting to escape, has put its nose into grid 33, so that it conducts electricity from grid 33 to grid 27 and is electrocuted. The animal is then cleared from the trap. This sequence is valid regardless of which end of the trap the animal enters. The doors are either transparent or frame structure.

FIG. 4 is a semi-schematic illustration of the elevator and mechanisms used for clearing an executed animal from the trap. Elevator 35 is an open structure comprising a keel 36 and a plurality of cross members, member 37 being typical.

The elevator is rectangular and extends over most of the floor 28 of the trap. Threaded nuts 38 and 39 are attached to diagonally opposite corners 40 and 41 of the elevator structure. The nuts are threaded onto threaded shafts 42 and 43 respectively, the shafts being vertical and situated in diagonally opposite corners of the trap. The shafts are driven by pulleys 44 and 45 at their upper ends 46 and 47. Pulley 44 and shaft 42 are driven by pulley 48, also on shaft 42 and in turn driven by toothed belt 49 and pulley 50 on shaft 51 of motor 11. Pulley 45 and shaft 43 are driven from pulley 44 by toothed belt 52. The elevator operates in cooperation with comb structure 53 which is hinged to side 18 at lower edge 54 of opening 19. The comb structure comprises spine 56 and a plurality of tines, tine 53 being typical. Arm 57 extending from the spine contacts side 18 to hold the tines at an angle such that an object resting on them would slide or roll out of exit opening 19. The tines on the comb structure are interspersed with the cross members of the elevator.

Figure 5A:
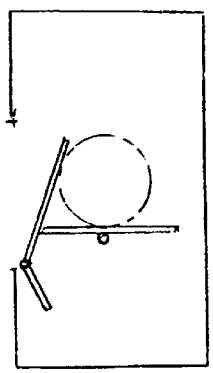
Figure 5B:
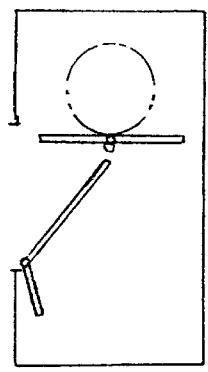
Figure 5C:
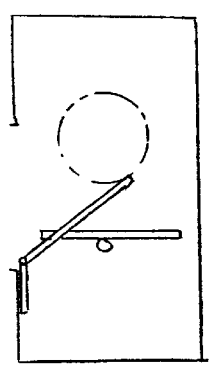

FIGS. 5, 5A and 5B are schematic sections taken at 5—5 in FIG. 4, illustrating the sequence of operation in clearing the trap. In FIG. 5 an electrocuted animal 20 is resting on elevator 35 near floor 28. In FIG. 5A the elevator has risen so that animal 20 is lifting the tines of the comb structure. In FIG. 5B the animal has been lifted so that the tines can drop into their at-rest position. In FIG. 5C the elevator has moved downward, leaving the animal resting on the comb structure, ready to slide and/or roll out of the trap through hole 19.

As the elevator rises it lifts the doors and re-latches them in their at-rest positions.

Figure 6:
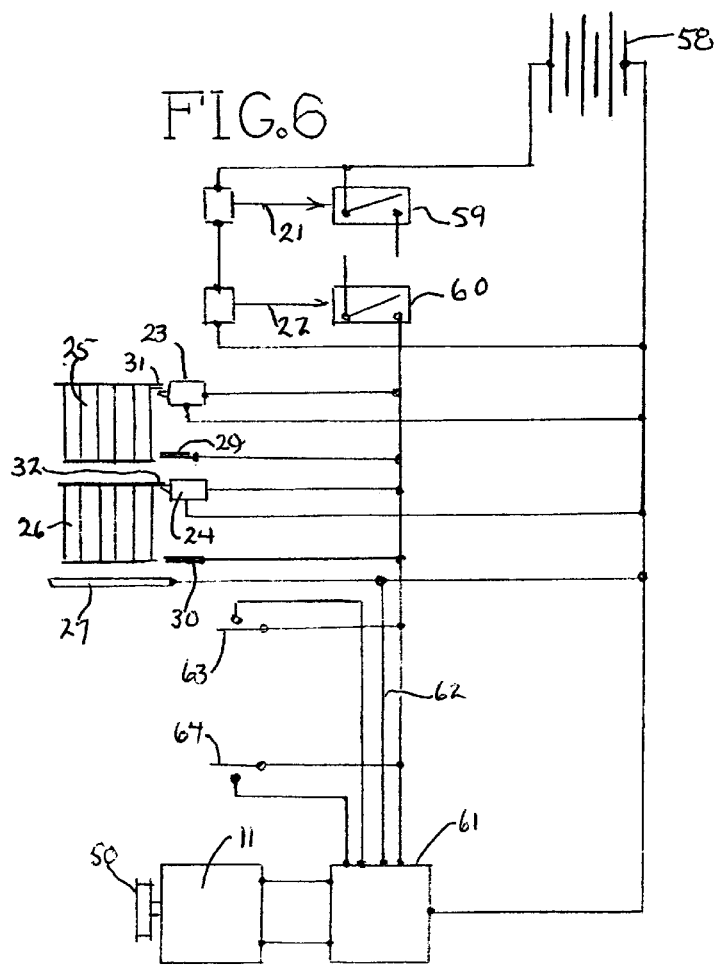
FIG. 6 is a schematic illustration of the electrical circuitry of the subject trap.

FIG. 6 is a schematic electrical diagram of the subject trap. For purposes of this disclosure, electrical power is supplied by battery 58. Switches 59 and 60 are caused to close when infrared beams 21 and 22 are interrupted and are self timed to open when the trap operation is complete. Alternately only one switch may be used and operates only when both beams are interrupted. These switches are in series and when both are closed electrical power is delivered to (1) latches 23 and 24 which normally retain door(s) 25 and 26 in their raised (open) positions; (2) to extension 31 and 32, and (3) to motor control component 61. The power to the latches releases the doors which drop to close the trap. Extensions 31 and 32, one on each door, then contact contacts 29 and 30 so that the grids on the doors are electrified. Grid 27 on which the animal is supported is connected to the negative pole of the battery. When the animal touches a door grid, power flows through the animal. This power flow is sensed in the motor control component via conductor 62 turning the motor on to raise the elevator. When the elevator reaches the upper limit of its travel it contacts switch 63 sending a signal to the motor control component which reverses the motor and lowers the elevator. When the elevator reaches the lower limit of its travel it contacts switch 64, sending a signal to the motor control component which again reverses the motor and then stops it. When switches 59 and 60 automatically open, the trap is ready for another cycle.

The electrical system as explained is illustrative and rudimentary. In practice, the circuitry will be state-of-the-art and provision of it is well within the capabilities of persons of ordinary skill in the art.

Figure 7:
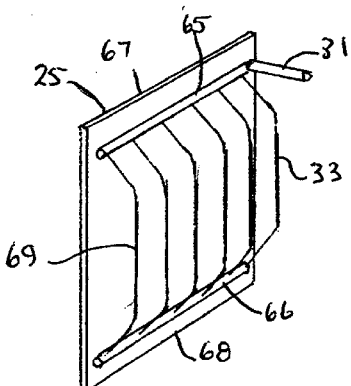
FIG. 7 illustrates details of the electrical grids on the doors of the subject trap.

FIG. 7 illustrates details of the electrical grids on the doors of the subject trap. Door 25 is made of non conductive material. Grid 33 comprises bus bars 65 and 66, which are attached to the door near its top edge 67 and bottom edge 68 respectively, and a plurality of conductors interconnecting the bus bars, conductor 69 being typical. The conductors are made of spring wire and are shaped so that most of their length is spaced away from the door a distance in a range of 0.25 to 1.00 inches. They are spaced apart distances in a range of 0.25 to 0.75 inches. In use, the nose of an animal attempting to escape is forced between two of the conductors, providing reliable electric contact between the animal and the grid. As explained above, extension 31 contacts contact 29 when the door is closed, connecting the grid to the power source. Extensions 31 and 32 are engaged by the keel of the elevator as it rises, lifting the doors to be latched by latches 23 and 24.

Figure 8:
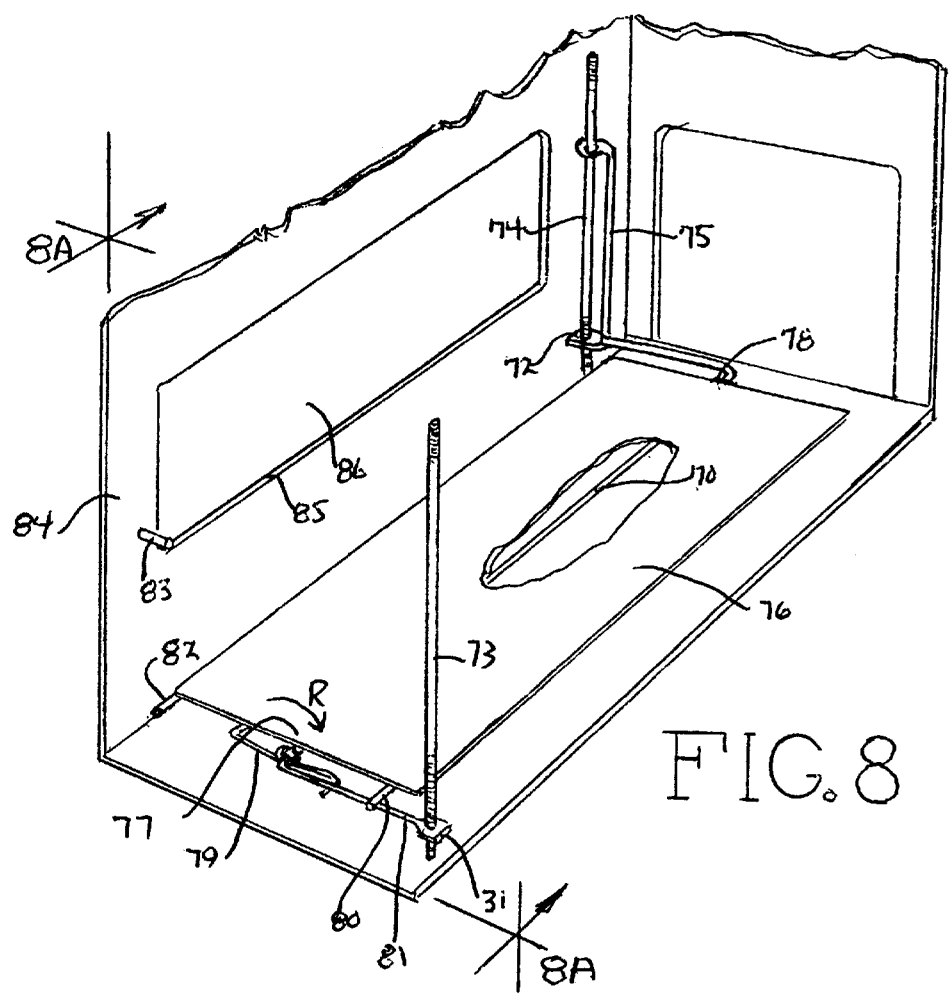
FIG. 8 is a schematic illustration of an alternate embodiment of the invention.

FIG. 8 is a schematic illustration of an alternate embodiment of the invention in which the elevator platform serves as the floor grid and the platform tips to cause the animal to roll or slide out the exit opening. The elevator comprises keel 70 which engages nuts 71 and 72 to be raised and lowered by rotation of threaded struts 73 and 74. Arm 75 loosely engages strut 74 to stabilize the keel in roll. Platform 76 is pivotally mounted on the keel at 77 and 78. Spring 79 tends to roll the platform in the direction of arrow R. Rolling in that direction is prevented by stop pin 80 which extends from the platform and engages portion 81 of the keel. As the elevator rises pin 82 extending from the platform engages stop 83 which extends from side 84, just above lower edge 85 of exit opening 86. Engagement of pin 82 with stop 83 causes the platform to roll, against the force of spring 79, as the keel continues to rise.

Figure 8A:
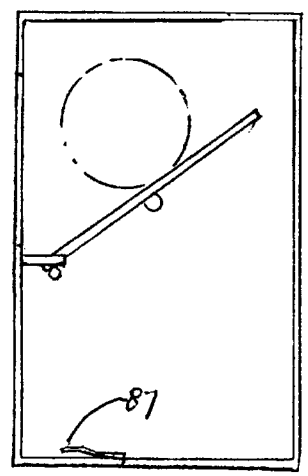
FIG. 8A is a schematic sectional view taken at 8A—8A in FIG. 8.

FIG. 8A is a schematic sectional view taken at 8A—8A in FIG. 8 and shows the elevator at its uppermost position with the platform rolled to cause the animal to roll and/or slide out the exit. The elevator platform is electrically conducted and contacts contact 87 when the elevator is in its out rest position, so that the platform serves as the floor grid in the electrocution circuitry.

Figure 9:
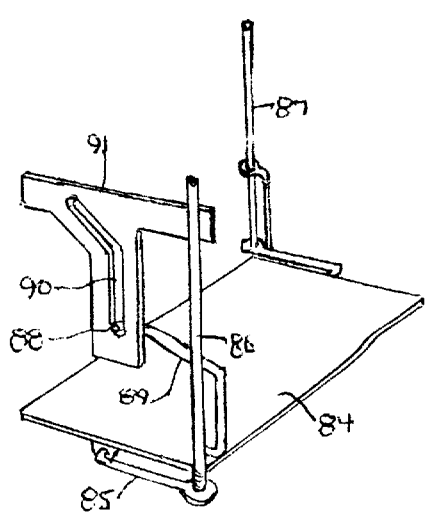
FIG. 9 is a schematic illustration of a third elevator configuration.

FIG. 9 is a schematic illustration of a third elevator configuration, similar to that of FIG. 8A but not using a spring platform 84 is pivoted on keel 85 which is raised and lowered on screw shafts 86 and 87. Tip 88 of arm 89 engages cam slot 90 in plate 91 attached to the side(s) and/or top of the trap just inside the grid on the door at one end of the trap. Arm 89 is attached to the platform and shaped to not obstruct the passageway through the trap. As the elevator moves the camming action tilts the platform as desired to eject the animals.

The trap housing may be made of transparent material, particularly the doors, or the entire structure may be frame structure.

It is believed to be understandable from this description that the subject invention meets its objectives. It provides a self clearing tunnel trap, the base of which rests directly on the surface supporting the trap and in which the trapped animal's head is the primary electrical contact. Further, the trapping and clearing of the trap do not involve weight sensitive mechanisms.

It is also considered to be understood that while certain embodiments of the invention are described herein, other embodiments and modifications of those described are possible within the scope of the invention which is limited only by the attached claims.

I claim:

1. An electrically powered tunnel trap for trapping an animal and having first and second ends, first and second sides, a first opening in said first end, a second opening in said second end and a third opening in said first side, said trap further comprising means for electrocuting said animal when said animal has entered said trap through either said first opening or said second opening and only when said animal is completely inside said trap, said trap further comprising means for clearing said trap of an electrocuted animal through said third opening, and first and second doors for closing said first and second openings, each of said doors having an inside, and in which said means for electrocuting comprises a grid attached to said inside of each of said doors, said grid comprising first and second bus bars and a plurality of conductors interconnecting said bus bars, each of said conductors having a length and being shaped such that most of said length is a distance from said inside of said door in a range of 0.25 to 1.00 inches, said conductors being distances from each other in a range of 0.25 to 0.75 inches.

2. The trap of claim 1 in which said means for clearing comprises an elevator.

* * * * *